Nov. 12, 1968 — K. W. KLEIN — 3,411,042
PANEL ASSEMBLY FOR SINGLE AND HALF WIDTH CIRCUIT BREAKERS
Filed May 23, 1967

INVENTOR.
KEITH W. KLEIN
BY
Robert F. Casey
ATTORNEY

United States Patent Office 3,411,042
Patented Nov. 12, 1968

3,411,042
PANEL ASSEMBLY FOR SINGLE AND HALF
WIDTH CIRCUIT BREAKERS
Keith W. Klein, Simsbury, Conn., assignor to General
Electric Company, a corporation of New York
Filed May 23, 1967, Ser. No. 640,638
6 Claims. (Cl. 317—119)

ABSTRACT OF THE DISCLOSURE

A panel assembly for circuit breakers of the type comprising a rectangular insulating casing with connecting terminals at opposite ends, the terminal at one end comprising a short flat strap or "tab" extending from a back corner of the casing parallel to the back wall and beyond the end of the casing. The panel includes three bus bars, which are connected to a three-phase A-C source, have a series of branch straps attached thereto, all having connecting portions aligned in a row centrally of the panel and parallel to the bus bars. Each connecting portion of the branch straps has a plurality of holes, the holes being arranged in a particular pattern such that either a single unit or modular width circuit breaker or two half-modular width circuit breakers can be connected. Also, either one single or two one-half modular width circuit breakers can be positioned in end-opposed relationship to the other breaker or breakers and can be similarly connected to the same branch strap portion by means of the holes therein.

Background of the invention

Recently circuit breakers of one-half the previous standard modular width have been introduced to the public. Also, circuit breakers having tab-type connectors, wherein a circuit breaker tab extending from the bottom of the breaker is attached to a bus bar by means such as a screw which extends through the circuit breaker tab into a tapped hole in the bus bar, have become quite common. Heretofore, specialized connecting means have been required for each modular size circuit breaker. Thus a given panelboard or load center panel assembly has been able to receive at any given location only one or the other of such modular types.

Summary of the invention

Accordingly, it is an object of the subject invention to provide a circuit breaker panel board with bus bar configuration and circuit breaker mounting provisions capable of receiving tab-type circuit breakers of either a single modular width or one-half the modular width at the same mounting location.

It is a further object to provide a circuit breaker panel board wherein at a single connecting location either a single modular width circuit breaker or two one-half modular width circuit breakers can be connected thereto.

It is a still further object to provide a circuit breaker panel board wherein a predetermined mounting relationship of single and half modular width breakers is insured.

Briefly described, the invention, in one form thereof, comprises a circuit breaker panel board having a plurality of longitudinally extending bus bars which are connected at one end to an A-C source. For three-phase A-C power three bus bars are provided with each of the side bus bars having laterally extending bus bar straps which are shaped so that the tab connecting portion thereof extends a short distance above the center bus bar. A substantially C-shaped bus bar strap also extends from the central bus bar so that the tab connecting portion thereof similarly is located a short distance above the central bus bar. Six symmetrically placed holes are provided on the tab connecting portions of each of the bus bar straps. A plurality of single modular width and one-half modular width tab-type circuit breakers are also provided. Means are provided on the panel board to engage an end of each circuit breaker. The circuit breakers have tab members at the other end, each with an aperture therein so that each tab member may be connected to one of the holes in one of the tab connecting portions by use of a screw or nut-and-bolt going through the aligned aperture and hole. One single modular width breaker can be connected to one of the center holes or two adjacent one-half modular width circuit breakers can be connected to two outer holes in a single bus bar connecting portion. In a similar manner two single modular width circuit breakers or two pairs of one-half modular width circuit breakers can be connected to each bus bar connecting portion in end-opposed arrangement therebetween. The holes are arranged to preclude a single modular width circuit breaker being inserted in a position intended to accommodate a half modular width circuit breaker and vice versa.

The subject matter which I regard as my invention is particularly pointed out and distinctly claimed in the claims at the conclusion of the specification.

Brief description of the drawings

Embodiments of my invention are described in detail in the following description taken in connection with the accompanying drawings in which.

Description of the preferred embodiments

Figure 1:
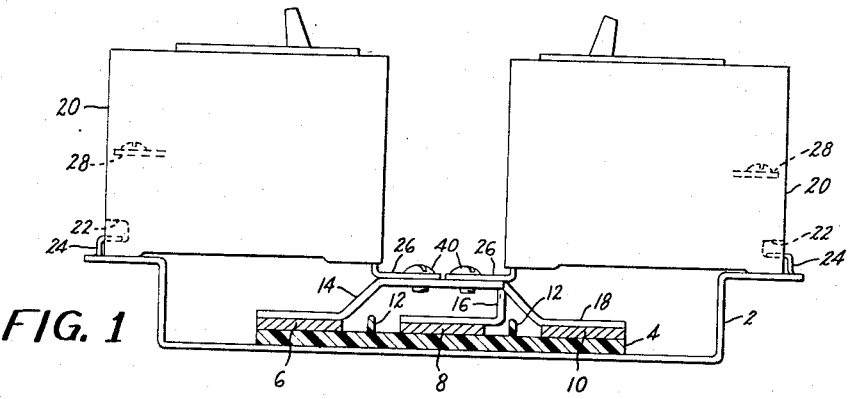
FIGURE 1 is a sectional end view of a panel board embodying the invention.

As shown in FIGURE 1, a circuit breaker panel board is provided comprising a support pan 2, an insulating bed 4, and a plurality of bus bars 6, 8, 10. Two longitudinally extending ridges 12 are provided in the insulating bed 4 so as to divide the bed into three longitudinally extending portions. Each of the portions has one of the bus bars attached thereon. The ends of the bus bars 6, 8, 10 are connected to a three-phase A-C source via terminals (not shown). Branch straps 14, 16, 18 are electrically connected to their respective bus bars 6, 8, 10. Circuit breakers such as those shown at 20 are connected to the panel board 2 by first engaging a recess 22 within the circuit breaker 20 with a hook 24 which is an integral part of the support pan 2. A tab member 26 on the end of the circuit breaker opposite the recess 22 is attached to one of the branch straps (such as 14) by either a screw or bolt arrangement. A terminal piece, such as a screw type connector 28, is provided in the end of the circuit breaker having the recess 22 so that the circuit breaker 20 can be connected to an electrical load.

Figure 2:
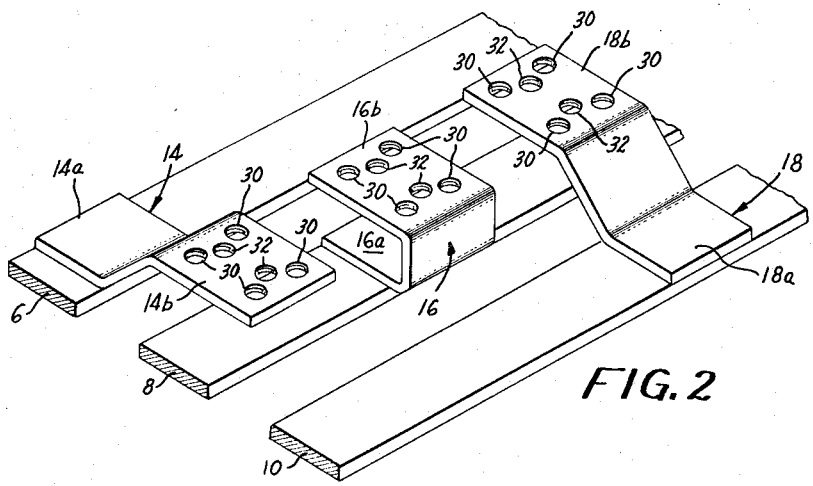
FIGURE 2 is a perspective view showing a portion of the bus bar arrangement and particularly the bus bar strap configuration.

In FIGURE 2 the arrangement of the branch bus bar straps 14, 16, 18 can more clearly be seen. The branch straps, which are extensions of the bus bars, are made of substantially rectangular flat metal members. The side straps 14, 18 are bent into an elongated S-type configuration. One end 14a, 18a of each side strap 14, 18 is mechanically and electrically attached to the respective bus bar 6, 10 by means such as welding or bolting. At the other end of each side branch strap 14, 18 are the tab connecting portions 14b, 18b. These portions are elevated a short distance above the central bus bar 8 so as to be insulated therefrom. The central bus bar strap 16 is substantially C-shaped, having one of its ends 16a mechanically and electrically attached to the center bus bar 8 and the other end, the tab connecting portion 16b, elevated the same distance above the center bus bar 8 as the other connecting portions 14b, 18b.

The straps 14, 16, 18 are positioned approximately one modular width apart. Each of the connecting portions 14b, 16b, 18b has six symmetrically placed tapped holes 30, 32 therein. The outer holes 30 are arranged so that their centers define a rectangle, and the remaining holes 32 are arranged centrally between the two sets of holes 30 but are positioned slightly closer together than the holes 30. It is obvious that the holes may be positioned in various configurations to achieve the same desired result. However, the particular configuration shown is one of the most structurally sound. Also, it may be desirable to have only the four outer holes 30 or only the two central holes 32 in a given connection portion so that only half modular width circuit breakers or only single modular width circuit breakers could be connected thereto.

Figure 3:
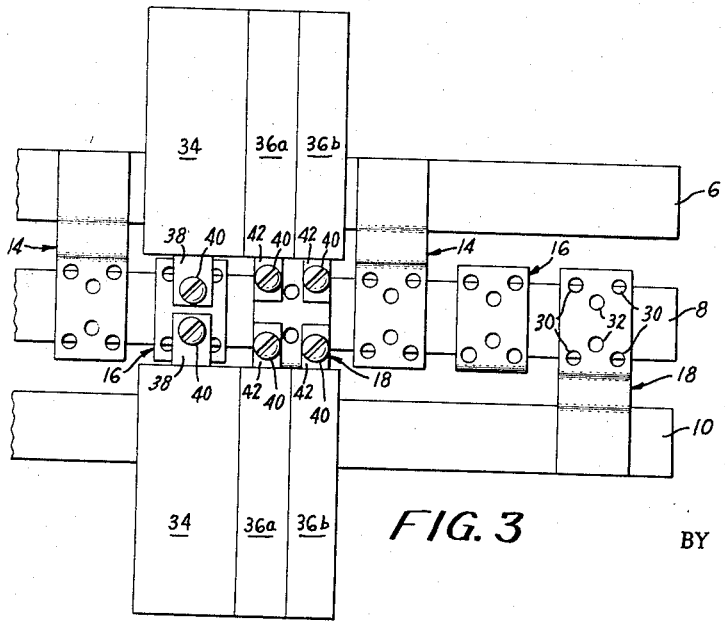
FIGURE 3 is a top view of a portion of the panel board embodying the invention.

In FIGURE 3 the engagement of a single modular width circuit breakers 34 and one-half modular width circuit breakers 36a and 36b is shown. The single modular width circuit breakers 34 have a tab member 38 (which corresponds to the member 26 shown in FIGURE 1) located at one end of the circuit breaker. The tab member has an aperture therein which is located so that it is aligned with one of the central holes 32 in the tab connecting portion of one of the straps when the circuit breaker 34 is properly positioned via the hook 24 engaging the recessed end of the breaker. The screw 40 is inserted within the aperture in the tab member 38 and is screwed into the tapped hole 32 in this bus bar strap so as to provide a rigid mechanical and electrical connection between the tab member 38 and the bus bar strap. In a similar manner, two adjacent one-half modular width circuit breakers 36a, 36b have the recessed portions thereof engaging hook 24 of the support pan. The breakers 36a, 36b are then positioned so that tab members 42 on the other end of the circuit breakers 36a and 36b contact the upper surface of a tab connecting portion and an aperture in each tab member 42 is aligned with one of the outer tapped holes 30 of the tab connecting portion. A screw 40 is inserted through each aperture and is screwed into the corresponding tapped hole 30 to provide rigid mechanical and electrical connection between the tab members 42 and the tab connecting portion. Of course, any suitable means of connection between the tab members and the tab connecting portion may be utilized. As a further example, the holes in the tab connecting portion need not be tapped and therefore a nut and bolt connection may be utilized between each of the tab members and the tab connecting portion. The single modular width spacing allows circuit breakers to be connected to the panel board with substantially no wasted space therebetween. As six holes, two sets of three holes, are provided, the circuit breakers can be connected to the panel board in end-opposed relationship. In this manner two single modular width breakers, four one-half modular width breakers, or one single and two one-half modular width breakers can be connected to a single tab connecting portion.

It can be seen that the holes 32 are displaced laterally of bus bar relative to the holes 30. This insures that there is a greater distance from the hook 24 to a hole 32 than from the hook 24 to a hole 30. Similarly, the aperture in the tab member 38 of a modular width circuit breaker is positioned a greater distance from the rear or hook-engaging end of the modular width breaker than the aperture in tab member 42 of the half-modular width circuit breaker is from the hook-engaging end of that type breaker. This relationship insures that the modular width and half modular width breakers are mounted in the proper locations and precludes the mounting of a modular width breaker in a position intended to accommodate a half modular width breaker and vice versa.

Other arrangements for insuring the proper positioning of the circuit breakers and precluding incorrect assembly may also be employed. For example, the holes 30 may be made of a different size than the holes 32 and the apertures in the members 42 and 38 may be made of correspondingly different sizes to accomplish this result.

The subject invention therefore provides a circuit breaker panel board which is able to receive circuit breakers having a tab-type contact which are either of a single modular width or of a half modular width. Either size of circuit breaker may easily be connected to the branch straps of the bus bars of the panel board. At any one connecting location either one single modular width circuit breaker or two adjacent one-half modular width circuit breakers may be engaged thereon without any modification or additional part being necessary.

It is contemplated within the present invention that modifications may be made to the structure of the bus bar and the tab members of the circuit breakers which do not depart from the scope and spirit of the present invention.

What I claim as new and desire to secure by Letters Patent of the United States is:

1. A circuit breaker panel assembly comprising:
    (a) a plurality of single and one-half modular width circuit breakers;
    (b) a support engaging one end of each of said circuit breakers;
    (c) each of said circuit breakers including at one end means engaging sad support and at the other end a conductive tab member having an aperture therein;
    (d) a plurality of substantially parallel bus bars adapted to be connected to an electrical source;
    (e) each of said bus bars including extension means having a connecting portion, said connecting portions being positioned in longitudinal alignment spaced from said bus bars;
    (f) at least one of said connecting portions having at least one set of three holes therein, said set of holes including two outer holes and a third hole therebetween;
    (g) said outer holes of said one connecting portion being positioned so that each is aligned with the aperture of the tab member of one of two adjacent one-half modular width circuit breakers when said two one-half modular width circuit breakers are in support engaging position;
    (h) said third hole of said one connecting portion being positioned so that it is aligned with the aperture of the tab member of one of said single modular width circuit breakers when said one single modular width breaker is in support engaging position; and
    (i) connecting means within said aligned apertures and holes connecting said one connecting portion to selected ones of said tab members.

2. In a circuit breaker panel board as in claim 1, the further improvement whereby:
    (a) at least one of said connecting portions has two sets of three holes therein, each set including two outer holes and a third hole therebetween, so that said circuit breakers may be connected to said connecting portion in end-opposed relationship.

3. A circuit breaker panel board as in claim 2 wherein each of said connecting portions has two sets of three holes therein.

4. A circuit breaker panel board as in claim 1 wherein said holes are tapped holes and said connecting means are screws, and one of said screws is fitted within each of the aligned apertures and screwed into the respective tapped holes.

5. A circuit breaker panel board as in claim 2 wherein there are three longitudinally extending bus bars which are adapted to be connected to a three-phase A-C electrical source; and said connecting portions are positioned in longitudinal alignment directly above the central bus bar.

6. A circuit breaker panel assembly comprising:
 (a) a plurality of single and one-half width circuit breakers;
 (b) a support engaging one end of each of said circuit breakers;
 (c) each of said circuit breakers including at one end means engaging said support and at the other end a conductive tab member having an aperture therein;
 (d) a plurality of substantially parallel bus bars adapted to be connected to an electrical source;
 (e) each of said bus bars including extension means having a connecting portion, said connecting portions being positioned in longitudinal alignment spaced from said bus bars;
 (f) at least one of said connecting portions having at least one set of three holes therein, said one set including two outer holes and a third hole therebetween;
 (g) the outer holes of said one connecting portion being disposed at a lesser distance from said support than said third hole;
 (h) said aperture in said tab member of a half modular width circuit breaker being disposed at a lesser distance from the support-engaging end of said half modular width circuit breaker than the aperture in the tab member of a modular width circuit breaker is from the support-engaging end thereof whereby said aperture of a half modular width circuit breaker can be aligned only with one of said outer holes and said aperture of a modular width breaker can be aligned only with said third hole; and
 (i) connecting means received within said aligned apertures and holes and connecting said one connecting portion to selected ones of said tab members.

References Cited

UNITED STATES PATENTS

| | | | |
|---|---|---|---|
| 2,735,043 | 2/1956 | Speck | 317—119 |
| 2,880,263 | 3/1959 | Herrmann et al. | 317—119 |
| 3,192,446 | 6/1965 | Meacham | 317—119 |

LEWIS H. MYERS, *Primary Examiner.*

J. R. SCOTT, *Assistant Examiner.*